Sept. 6, 1966     R. L. COOPE     3,270,422
MICROMETER CALIPER
Filed July 6, 1964
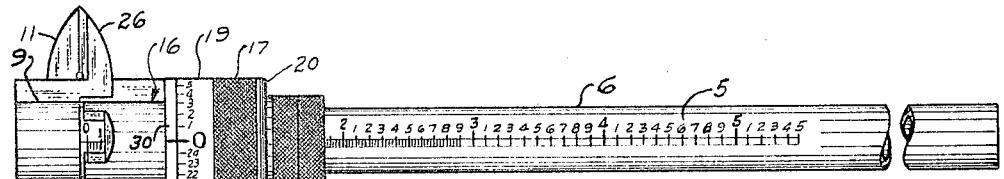
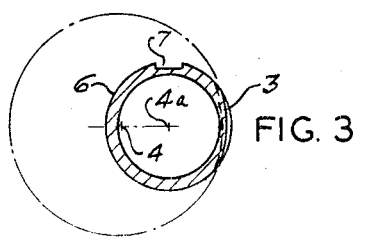
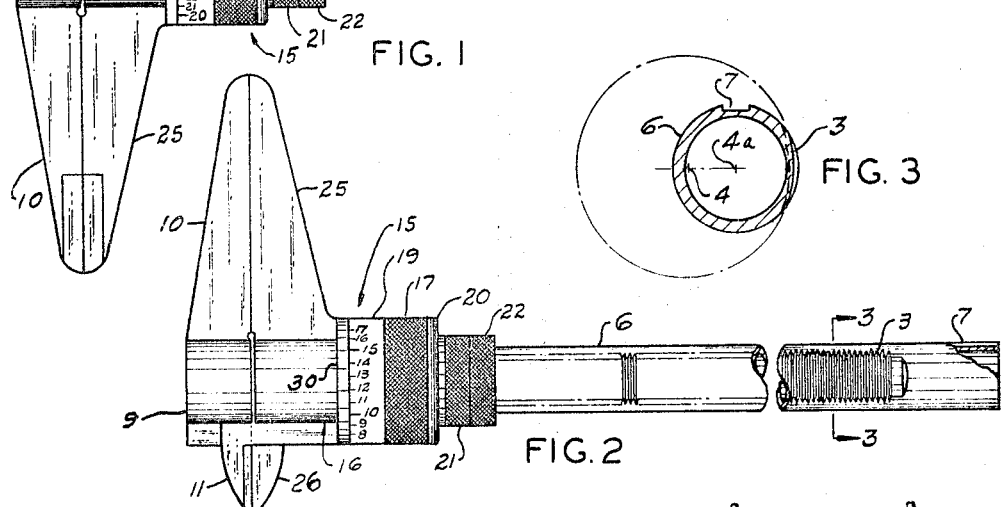
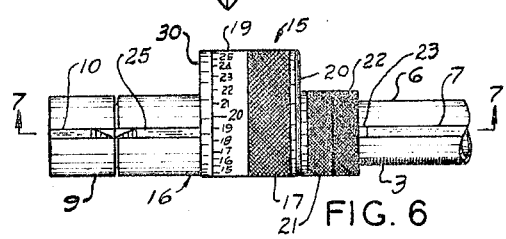
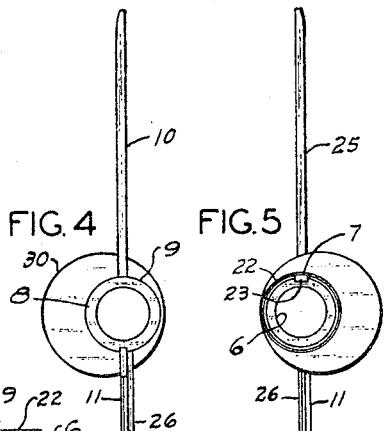
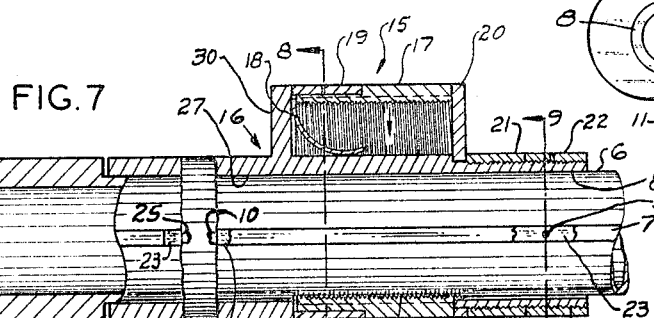
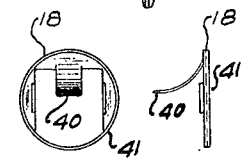
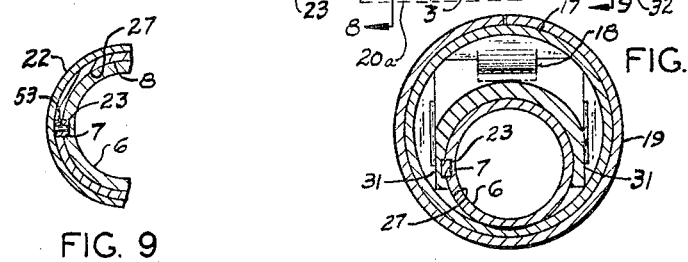
INVENTOR
Robert L. Coope
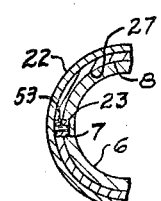

3,270,422
MICROMETER CALIPER
Robert L. Coope, 3946 W. Clarendon, Phoenix, Ariz.
Filed July 6, 1964, Ser. No. 380,250
3 Claims. (Cl. 33—165)

This invention concerns a micrometer caliper for inside and outside measurements.

The object of this device is to combine the accuracy, sensitivity of feel, and readability of a standard micrometer, with the range and flexibility of a vernier caliper. To attain this object the caliper is designed so that a moving gaging member can be moved with reference to a fixed gaging member by means of a micrometer thread, thus incorporating the accuracy, sensitivity of feel, and ease of readability inherent in measuring devices which employ micrometer threads. Range and flexibility in this caliper are made possible by a means of disengaging the male thread on the fixed gaging member from a female thread on the movable gaging member for rapid movement of the latter throughout the range of the caliper. The attainment of this object of range and flexibility if furthered by the inclusion of internal, external and depth gaging components similar to those used on venier calipers.

Another object of the caliper is to provide a moving gaging blade which can be moved with reference to a stationary gaging blade using a micro thread combined with a quickly detaching means so that the movable head can be rapidly and easily moved from any large measurement to a small measurement.

Another object is to provide a micrometer gage having a screw thread operated movable gaging blade and supporting head operated by a screw in the stationary part which can be easily detached from the movable head so that the movable head will slide freely on the stationary head portion of the device.

Still another object is to provide a nut which will operate between the moving part and its gaging blade and the stationary part and its gaging blade combined with disconnecting means whereby the screw thread will be rendered inoperative at the will of the user.

Still another object is to provide a device, above described, with a depth gage carried on the moving part of the caliper.

Still another object is to provide means for adjusting the tension of the moving part and means for setting the adjustment when desired.

Still another object is to provide a movable graduated collar to indicate the fine or micrometer settings.

Other objects will appear hereinafter.

I attain the foregoing objects by means of the devices, parts and groups of parts shown in the accompanying drawings in which—

FIGURE 1 is a side elevational view of a complete micrometer caliper incorporating my improvements.

FIGURE 2 is a side elevation of the device shown in FIGURE 1, viewed from the opposite side.

FIGURE 3 is a section taken through the bar portion of the gage and drawn on a somewhat enlarged scale.

FIGURE 4 is an elevational view of the head end of the gage.

FIGURE 5 is an elevational view of the end opposite the head end.

FIGURE 6 is a plan view of a portion of the head end of the gage.

FIGURE 7 is a fragment of the head portion of the stationary part of the gage, together with the movable head taken on line 7—7 and drawn on a somewhat enlarged scale.

FIGURE 8 is a cross section of the sliding portion of the gage taken on line 8—8 of FIGURE 7, and drawn on the scale as FIGURE 7.

FIGURE 9 is a partial cross section of the portion of the gage shown in FIGURE 7 and taken substantially on line 9—9 of FIGURE 7.

FIGURE 10 is a front elevational view of the spring spacer which slides on the sliding gage member.

FIGURE 11 is a side elevational view of the spring spacer, as shown in FIGURE 10.

Similar numerals refer to similar parts in the several views.

The instrument is composed in general of two groups of parts, the first part is a fixed gaging assembly and the second assembly is the sliding gage assembly.

The first part assembly comprises a tubular bar 6 which is ground to have a fine finish on its outside surface. On one side of the bar and running throughout most of its length is a partial thread 3 whose center line 4 is eccentric relative to the axis 4a of the bar. On the side of the bar opposite the partial eccentric thread there are numbered graduations 5, marked on the outside surface of the bar.

A narrow slot 7 is machined in the bar throughout its entire length. This slot resembles a keyway.

The bar is pressed into a hole 8 formed in the fixed gage portion 9 which may be termed a one piece detail with two blades. The upper blade 10 is for gaging outside dimensions and the lower blade 11 is for gaging inside dimensions. The gaging surfaces of the two blades are ground so that they are in a common plane which is at right angles to the axis of the tubular bar.

The sliding gage assembly 15 is made up of eight parts. These include the main body 16, the micrometer nut 17, a spring spacer 18, a graduated collar 19, a back spacer 20 and an adjusting nut 21, together with a lock nut 22. A depth gage bar 23 is also part of this assembly.

The main body 16 is a single piece and is provided with two gaging blades identical to those of the fixed gage previously described, but disposed at opposite positions. Of these gaging blades, 25 is the long blade for gaging outside dimensions and 26 is a short blade for gaging inside dimensions. The main body 16 is provided with a machined hole 27 which has a diameter to make it slip fit over the bar 6. On the front portion of the main body there is an annular flange 30 whose axial center line 4 is eccentric with the center line through the body by an amount equal to the eccentricity between the center lines of the partial thread 3 and the axis 4a of the bar 6. To the rear of flange 30 there is an annular area on which two flat surfaces 31 are machined to receive a corresponding opening in spring spacer 18. This structure holds the spacer 18 on the main body 16.

Following the annular area for the spring spacer the material is partially cut away to permit engagement of the micrometer nut 17 with the eccentric partial thread 3 on bar 6. The main body terminates with a threaded boss 32 where the back spacer adjusting nut 21 and lock nut 22 are disposed.

The micrometer nut is turned to provide an outside diameter to accept the graduated collar 19 for fine measurements. The remainder of this diameter is knurled. The graduated collar projects beyond the front face of the micrometer nut to form a counter-bore in which the spring spacer 18 is located. The bore of the micrometer nut is threaded to engage the thread 3 on the one side of bar 6.

The spring spacer 18 is formed from spring steel or beryllium copper to provide a flat spring 40 and spacer 41 which fits in the counter-bore of the micrometer nut. This serves a dual purpose of exerting pressure on the micrometer nut 17 to engage the partial threads 3 and to keep the nut in its proper position of eccentricity relative to the bar.

Beyond and to the rear of the nut, above described, there is a back spacer 20 which is placed against the back face of the micrometer nut 17. This serves as a thrust washer for the micrometer nut. An adjusting nut 21 threads onto the threaded boss 32 of the main body 16 and brings the back spacer 20 in contact with the micrometer nut 17. This, in turn, is brought into contact with the back face of the flange 30 on the main body 16. The adjusting nut and lock nut 22 function to eliminate end play between the micrometer nut and the main body.

The depth gage bar 23 is a relatively long narrow piece of spring steel which fits and slides in the longitudinal keyway-like slot on bar 6 and is fastened to the main body 16 at 53. This piece serves both as a depth gage and as a key to prevent the sliding gage assembly from rotating on the bar 6.

When the device is assembled, the micrometer nut engages the eccentric thread on bar 6. The sliding gage assembly 15 may be slid along the bar 6 by revolving the knurled micrometer nut, the thread relation of these parts being such that one revolution of the nut will traverse the sliding gage a distance of one graduation, as marked on the bar. The graduated collar is marked in convenient annularly positioned subdivisions in a manner identical to the method used on standard micrometers. In reading a measurement, the fine reading on the graduated collar is added to the coarse reading on the bar graduation.

The micrometer nut may be disengaged from the eccentric thread by pressing nut with user's thumb to the position as indicated by the dotted outline 20a, FIGURE 7. This easily and quickly disengages the interior thread of the nut from the partial thread on the bar. The sliding assembly is then free to move along the bar 6 for rapid coarse adjustments. When the nut is released it re-engages the eccentric thread and final adjustments are made by revolving the nut until the desired position is attained.

I claim:

1. A micrometer caliper comprising a stationary frame having a head end and a foot end, a cylindrical bar extending from the head end of said frame, said bar having a partial thread formed on one side with its center eccentric relative to the center of said bar; a gaging blade extending substantially radially from the head end of said frame; a longitudinal groove extending along said bar; indicia marked on said bar parallel to said groove to indicate measures of length of said bar; a sliding gage assembly having a head end and a foot end, a main body on said head end having an eccentrically disposed flange and a bore with a slidable fit on the bar of said stationary frame, a gaging blade supported on the head end of said main body and extending radially therefrom and aligned with the gaging blade on the head end of said stationary frame, a threaded boss at the foot end of said main body, a micrometer nut having an inner bore threaded to engage the partial threads on said stationary bar; a spring within said micrometer nut resiliently holding said nut in position on said head and urging said internal threads to operating contact with the partial thread on said bar; an adjusting nut on said boss on said body holding said micrometer nut slidably between said annular flange and the inner face of said nut; an adjusting nut having a face bearing against said micrometer nut to adjust pressure against said micrometer nut, a locking ring nut engaging said adjusting nut, a depth gage attached to said sliding gage assembly and adapted to slide in the longitudinal groove on said bar; a graduated ring on said threaded micrometer nut having an annularly arranged indicia on its outer surface.

2. The device described in claim 1, together with inside measuring and gaging blades attached to the head end of said stationary bar and the head end of said sliding main body, respectively, having surfaces for engaging internal portions of objects to be gaged.

3. A micrometer caliper comprising a stationary frame having a head end and a foot end, a cylindrical bar extending from the head end of said frame, said bar having a partial thread formed on one side eccentric relative to the center of said bar; a guide slot extending along said bar; indicia marked on said bar parallel to said guide slot to indicate measures of length along said bar; a sliding gage element having a head end and a foot end, a main body on said head end having an eccentrically disposed flange and a bore to provide a slidable fit on the bar of said stationary frame, gaging blades on the head end of said main body and extending radially therefrom and aligned with the gaging blades on the head end of said stationary frame, a threaded boss at the foot end of said main body, a micrometer nut having an inner bore threaded to engage the partial threads on said stationary bar; a spring within said micrometer nut resiliently holding said nut in position on said head and urging said internal threads of said nut into operating contact with the partial thread on said bar; an adjusting nut on said boss on said body having an inner face holding said micrometer nut slidably between said annular flange and the said inner face of said nut; an adjusting nut to adjust pressure on said micrometer nut; a depth gage spring attached to said sliding gage assembly adapted to slide in the longitudinal groove on said bar; a graduated ring on said micrometer nut having indicia annularly arranged on its outer surface and readable with reference to a fixed mark on said annular flange.

References Cited by the Examiner

UNITED STATES PATENTS

| | | | |
|---|---|---|---|
| 301,945 | 7/1884 | Winn | 33—165 X |
| 679,258 | 7/1901 | Giebeler | 33—165 |
| 909,538 | 1/1909 | Buckminster | 33—165 |
| 1,040,078 | 10/1912 | Widen | 33—163 X |
| 1,105,549 | 7/1914 | Cordier | 33—165 X |
| 1,230,249 | 6/1917 | Wenzel | 33—165 |
| 1,516,631 | 11/1924 | d'Erville | 33—143 |
| 2,252,146 | 8/1941 | Walsh | 33—170 |
| 3,060,586 | 10/1962 | Yamamato | 33—163 |

LEONARD FORMAN, *Primary Examiner.*

ISAAC LISANN, *Examiner.*

W. D. MARTIN, JR., *Assistant Examiner.*